US008424371B2

(12) United States Patent
Seitz (10) Patent No.: US 8,424,371 B2
(45) Date of Patent: Apr. 23, 2013

(54) METHOD, APPARATUS AND SYSTEM FOR ANALYSING A VEHICLE WHEEL

(75) Inventor: Norbert Seitz, Gröbenzell (DK)

(73) Assignee: Lars Bertil Carnehammar, Zurich (CH)

( * ) Notice: Subject to any disclaimer, the term of this patent is extended or adjusted under 35 U.S.C. 154(b) by 393 days.

(21) Appl. No.: 12/935,557

(22) PCT Filed: Mar. 31, 2009

(86) PCT No.: PCT/EP2009/053780
§ 371 (c)(1),
(2), (4) Date: Sep. 29, 2010

(87) PCT Pub. No.: WO2009/121860
PCT Pub. Date: Oct. 8, 2009

(65) Prior Publication Data
US 2011/0023589 A1 Feb. 3, 2011

(30) Foreign Application Priority Data

Mar. 31, 2008 (EP) ..................................... 08006489

(51) Int. Cl.
*G01M 1/00* (2006.01)
(52) U.S. Cl.
USPC .................................................. 73/66; 73/146
(58) Field of Classification Search .............. 73/66, 146, 73/460, 459; 301/5.21
See application file for complete search history.

(56) References Cited

U.S. PATENT DOCUMENTS

| | | | |
|---|---|---|---|
| 4,139,395 A * | 2/1979 | Dunlap | 106/144.72 |
| 4,867,792 A * | 9/1989 | Ronlan | 106/162.5 |
| 5,431,726 A | 7/1995 | Ronlan | |
| 5,537,866 A * | 7/1996 | Bangert et al. | 73/146 |
| 6,313,742 B1 * | 11/2001 | Larson | 340/442 |
| 7,339,460 B2 * | 3/2008 | Lane et al. | 340/438 |
| 7,368,024 B2 * | 5/2008 | Majumdar et al. | 156/110.1 |
| 8,150,613 B2 * | 4/2012 | Engelhard | 701/124 |
| 8,215,349 B2 * | 7/2012 | Seitz | 152/154.1 |

(Continued)

FOREIGN PATENT DOCUMENTS

| | | |
|---|---|---|
| DE | 38 23 926 A1 | 1/1990 |
| DE | 197 19 886 A1 | 11/1998 |

(Continued)

*Primary Examiner* — Peter Macchiarolo
*Assistant Examiner* — Samir M Shah
(74) *Attorney, Agent, or Firm* — Foley & Lardner LLP (57) ABSTRACT

A method of analyzing a vehicle wheel comprising a tire of a predetermined configuration and a thixotropic balancing substance, comprising rotating the vehicle wheel with a predetermined number of revolutions for a period of time, wherein a tread surface of the tire is pressed in a first contact area against a rotatable drum with a predetermined force, and a first acceleration in the first contact area is measured with a measuring device; rotating another vehicle wheel comprising another tire of the predetermined configuration with the predetermined number of revolutions for another period of time, the other vehicle wheel being conventionally balanced and having another residual unbalance, wherein another tread surface of the other tire is pressed in a second contact area against the rotatable drum with the predetermined force, and a second acceleration in the second contact area is measured with the measuring device and if the first acceleration is less than or equal to the second acceleration, determining that the vehicle wheel is balanced. An apparatus, and a system, for analysing a vehicle wheel comprising a tire of a predetermined configuration and a thixotropic balancing substance according to the method.

14 Claims, 4 Drawing Sheets

U.S. PATENT DOCUMENTS

| | | | |
|---|---|---|---|
| 2003/0005764 A1* | 1/2003 | Colarelli et al. | 73/462 |
| 2003/0006890 A1* | 1/2003 | Magiawala et al. | 340/438 |
| 2007/0044893 A1* | 3/2007 | Majumdar et al. | 156/115 |
| 2009/0138191 A1* | 5/2009 | Engelhard | 701/124 |
| 2009/0272471 A1* | 11/2009 | Bormann | 152/154.1 |
| 2009/0293603 A1* | 12/2009 | Douglas | 73/146 |
| 2010/0006195 A1* | 1/2010 | Seitz | 152/154.1 |
| 2010/0199760 A1* | 8/2010 | Seitz | 73/460 |
| 2011/0203741 A1* | 8/2011 | Seitz | 157/1.17 |
| 2011/0212265 A1* | 9/2011 | Seitz | 427/299 |
| 2011/0260522 A1* | 10/2011 | Bormann | 301/5.21 |
| 2012/0204632 A1* | 8/2012 | Kirstatter | 73/121 |
| 2012/0222516 A1* | 9/2012 | Carnehammer et al. | 74/573.1 |
| 2012/0252591 A1* | 10/2012 | Seitz | 464/180 |
| 2012/0260766 A1* | 10/2012 | Seitz | 74/573.1 |

FOREIGN PATENT DOCUMENTS

| | | |
|---|---|---|
| DE | 198 57 646 A1 | 6/2000 |
| DE | 198 53 691 A1 | 7/2000 |
| DE | 199 16 564 A1 | 10/2000 |
| EP | 0 281 252 A1 | 9/1988 |
| EP | 281252 A1 * | 9/1988 |
| EP | 2113401 A2 * | 11/2009 |
| JP | 2009269597 A * | 11/2009 |
| WO | WO 98/52009 A | 11/1998 |
| WO | WO 9852009 A1 * | 11/1998 |
| WO | WO 2008009696 A1 * | 1/2008 |

* cited by examiner

METHOD, APPARATUS AND SYSTEM FOR ANALYSING A VEHICLE WHEEL

Cross-Reference to Related Applications

This application is the U.S. National Phase of PCT/EP2009/053780 filed Mar. 31, 2009, which claims priority to European Application No. EP 08006489.2 filed Mar. 31, 2008, The subject matter of each of the above-referenced applications is incorporated in entirety by reference.

FIELD OF THE INVENTION

Embodiments of the invention described herein relate generally to analyzing a vehicle wheel, and more particularly to a method, an apparatus and a system for analyzing a vehicle wheel comprising a pneumatic tires and a viscous balancing substance.

BACKGROUND OF THE INVENTION

EP patent application 0 281 252 and corresponding U.S. Pat. No. 4,867,792 disclose a thixotropic tire balancing composition having a yield stress value between 30 Pa and 260 Pa being capable of balancing tires by being able to flow under the influence of the vibrations induced when a heavy spot on the tire hits the road surface. The balancing composition distributes itself in a wheel assembly consisting of a tire mounted on a rim and having a heavy spot.

DE patent application 3823926 discloses a method and an apparatus for the analysis of production-dependent, circumferentially distributed non-uniformities of a vehicle tire, wherein a predetermined non-uniformity is analyzed by successively mounting a plurality of tires on the measuring rim in each case with the point having the non-uniformities to be analyzed in the same respective angular rotation position, storing the magnitudes of the non-uniformities of each tire measured around its circumference and adding them up. The method is suitable, inter alia, for the quality control of motor vehicle tires.

U.S. Pat. No. 5,431,726 discloses a tire gel balancing composition having a Storage modulus of between 3000 and 15000 Pa and a Specific Gravity less than 1000 kg/m$^3$ in the temperature range between −20° C. and +90° C. and being capable of balancing tires by being able to flow under the vibrations caused by imbalance in a wheel assembly.

PCT patent application WO 98/52009 and corresponding DE patent application 197 19 886 disclose a method for balancing automobile wheel assemblies comprising pneumatic tires, comprising introducing a viscous balancing composition into the tire; mounting the wheel on a rotatable assembly; pressing a rotatable drum and the tread surface of the wheel in the rotatable assembly against one another with a static force F, the axes of rotation of the drum and the wheel assembly being essentially parallel; and driving the drum and/or the wheel assembly to rotation for a time period T; the force F and the time T being sufficient to cause the balancing composition to be distributed inside the tire, thereby balancing the wheel assembly. The method may preferably be carried out on an apparatus comprising a rotatable assembly on which a wheel assembly comprising a rim and a pneumatic tire may be mounted; a rotatably mounted drum having an axis of rotation essentially parallel to that of the rotatable wheel assembly, the axes drum and/or the rotatable wheel assembly being capable of being moved in a direction towards and away from one another; driving means for rotating the rotatable wheel assembly and/or the drum; spring means and dampening means for providing static force and dampening in a direction between the axes of rotation of the drum and the rotatable wheel assembly, respectively, and essentially at right angles to said axes; and spring means and/or dampening means mounted between the axis of rotation of the rotatable wheel assembly and the ground and/or between the axis of rotation of the drum and the ground.

DE patent application 198 57 646 discloses a method for balancing tires by introducing a balancing substance inside the tire, comprising placing a substance with definite properties, shape, geometry and weight inside the tire; and moving to the point of imbalance by rotating the tire. The method may also be used for balancing other rotating objects.

DE patent application 198 53 691 discloses a method for introducing tire-balancing substance as internal circumferential gel bead. The substance characteristic, shape, weight, geometry and its deposition locations are defined. The internal surface of the tire exhibits defined shape and geometry. One or more endless strands may be employed. Strand cross section may be circular, semicircular, flattened, triangular, quadrilateral or polygonal. The one or more strands are distributed over the entire circumference, or just part of it, or both types of distribution take place. Strand portions are applied opposite the valve, when mounted on the rim. They are applied at or away from the equatorial plane, symmetrically, or else asymmetrically. The substance is injected through the valve in set quantity. A gel with a defined viscosity, thixotropy, long term stability, and compatibility with the tire's inner surface is used. The tire has one or more circumferential grooves, optionally between beads, to accept the substance.

DE patent application 199 16 564 discloses a method and an apparatus for distributing weights in tires, involving applying weight material to the inner liners of tires. Tire inhomogeneity is measured on a conventional machine before the tire is on the rim and the measurement values are fed to a computer, which determines the quantity of weight material to be applied and where to apply it to compensate the inhomogeneity and which is coupled to a machine for applying weight material to the required place in the required quantity.

A viscous, for example thixotropic, balancing substance, for example composition, may be used for balancing a vehicle wheel comprising a tire. The balancing substance may be inserted into the tire before the tire is mounted to a rim, or through a valve. For balancing the vehicle wheel, the substance may be distributed by driving a vehicle comprising the vehicle wheel, or mounting the vehicle wheel on a rotatable assembly; pressing a rotatable drum and a tread surface of the vehicle wheel in the rotatable assembly against one another with a static force; and driving the drum and/or the vehicle wheel to rotation for a time period; the force and the time being sufficient to cause the balancing composition to be distributed inside the tire, thereby balancing the vehicle wheel.

Driving experience of a vehicle is determined, among other factors, by surface quality of the road and quality, e.g. homogeneity or uniformity, of the vehicle's wheels. A vehicle wheel is a system comprising a tire, a rim and a valve. Non-uniformity or inhomogeneity of the vehicle wheel may result from an uneven mass distribution, i.e. unbalance, of a tire or a rim or both, a geometrical abnormality, for example axial run-out or radial run-out or both, of the tire or the rim or both, or a variation in axial, radial or tangential stiffness (axial-force fluctuation, radial-force fluctuation, tangential-force fluctuation) of the tire or the rim or both, or off-centre mounting of the tire on the rim or the rim on a vehicle's axle or both. While some types of non-uniformities, for example resulting from an overlap of material or a valve hole, are intentional, others, for example resulting from uneven distances and densities of cord fabrics, i.e. threads, during production, subsidence behavior during mounting or flat spots owing to thermoplastic behavior after driving, are unintentional. Thus, balancing the wheel improves the driving experience, as it compensates for the uneven mass distribution, but not the variations in stiffness.

If the tire is according to its specification and, thus, does not have a significant geometrical abnormality, such as axial run-out or radial run-out, or significant variations in axial, radial or tangential stiffness, the balanced vehicle wheel provides, from a subjective view, for a comfortable driving experience.

However, vehicle manufactures and also repair shops need a method, an apparatus and a system for efficiently, and preferably predominantly automatically, analyzing whether a vehicle wheel comprising a tire and a thixotropic balancing substance is balanced, or determining a residual unbalance of the vehicle wheel.

Conventional methods, apparatuses and systems for analyzing conventional vehicle wheels, i.e. vehicle wheels balanced with metal, e.g. zinc, weights, without load cannot be used for efficiently analyzing a vehicle wheel comprising a tire and a thixotropic balancing substance.

For these and other reasons, there is a need for the invention as set forth in the following in the embodiments.

SUMMARY OF THE INVENTION

The invention aims to provide a method, an apparatus and a system for analyzing vehicle wheels comprising pneumatic tires and a viscous balancing substance.

An aspect of the invention is a method of analyzing a vehicle wheel comprising a tire of a predetermined configuration and a thixotropic balancing substance, comprising rotating the vehicle wheel with a predetermined number of revolutions for a period of time, wherein a tread surface of the tire is pressed in a first contact area against a rotatable drum with a predetermined force, and a first acceleration in the first contact area is measured with a measuring device; rotating another vehicle wheel comprising another tire of the predetermined configuration with the predetermined number of revolutions for another period of time, the other vehicle wheel being conventionally balanced and having another residual unbalance, wherein another tread surface of the other tire is pressed in a second contact area against the rotatable drum with the predetermined force, and a second acceleration in the second contact area is measured with the measuring device and if the first acceleration is less than or equal to the second acceleration, determining that the vehicle wheel is balanced.

Another aspect of the invention is an apparatus for analyzing a vehicle wheel comprising a tire of a predetermined configuration and a thixotropic balancing substance according to the method.

A further aspect of the invention is a system for analyzing a vehicle wheel comprising a tire of a predetermined configuration and a thixotropic balancing substance according to the method.

BRIEF DESCRIPTION OF THE SEVERAL VIEWS OF THE DRAWING(S)

While the specification concludes with claims particularly pointing out and distinctly claiming that which is regarded as the invention, a more particular description of the invention will be rendered by reference to specific embodiments thereof, which are depicted in the appended drawings, in order to illustrate the manner in which embodiments of the invention are obtained. Understanding that these drawings depict only typical embodiments of the invention, that are not necessarily drawn to scale, and, therefore, are not to be considered limiting of its scope, embodiments will be described and explained with additional specificity and detail through use of the accompanying drawings in which:

DETAILED DESCRIPTION OF THE INVENTION

In the following detailed description of the embodiments, reference is made to the accompanying drawings which form a part hereof and show, by way of illustration, specific embodiments in which the invention may be practiced. In the drawings, like numerals describe substantially similar components throughout the several views. The embodiments are intended to describe aspects of the invention in sufficient detail to enable those of skill in the art to practice the invention. Other embodiments may be utilized and structural, logical or electrical changes or combinations thereof may be made without departing from the scope of the invention. Moreover, it is to be understood, that the various embodiments of the invention, although different, are not necessarily mutually exclusive. For example, a particular feature, structure or characteristic described in one embodiment may be included within other embodiments. Furthermore, it is to be understood, that embodiments of the invention may be implemented using different technologies. Also, the term "exemplary" is merely meant as an example, rather than the best or optimal. The following detailed description is, therefore, not to be taken in a limiting sense, and the scope of the invention is defined only by the appended claims, along with the full scope of equivalents to which such claims are entitled.

Reference will be made to the drawings. In order to show the structures of the embodiments most clearly, the drawings included herein are diagrammatic representations of inventive articles. Thus, actual appearance of the fabricated structures may appear different while still incorporating essential structures of embodiments. Moreover, the drawings show only the structures necessary to understand the embodiments. Additional structures known in the art have not been included to maintain clarity of the drawings. It is also to be understood, that features and/or elements depicted herein are illustrated with particular dimensions relative to one another for purposes of simplicity and ease of understanding, and that actual dimensions may differ substantially from that illustrated herein.

In the following description and claims, the terms "include", "have", "with" or other variants thereof may be used. It is to be understood, that such terms are intended to be inclusive in a manner similar to the term "comprise".

In the following description and claims, the terms "coupled" and "connected", along with derivatives such as "communicatively coupled" may be used. It is to be understood, that these terms are not intended as synonyms for each other. Rather, in particular embodiments, "connected" may be used to indicate, that two or more elements are in direct physical or electrical contact with each other. However, "coupled" may also mean that two or more elements are not in direct contact with each other, but yet still co-operate or interact with each other.

In the following description and claims, terms, such as "upper", "lower", "first", "second", etc., may be only used for descriptive purposes and are not to be construed as limiting. The embodiments of a device or article described herein can be manufactured, used, or shipped in a number of positions and orientations.

Figure 1:
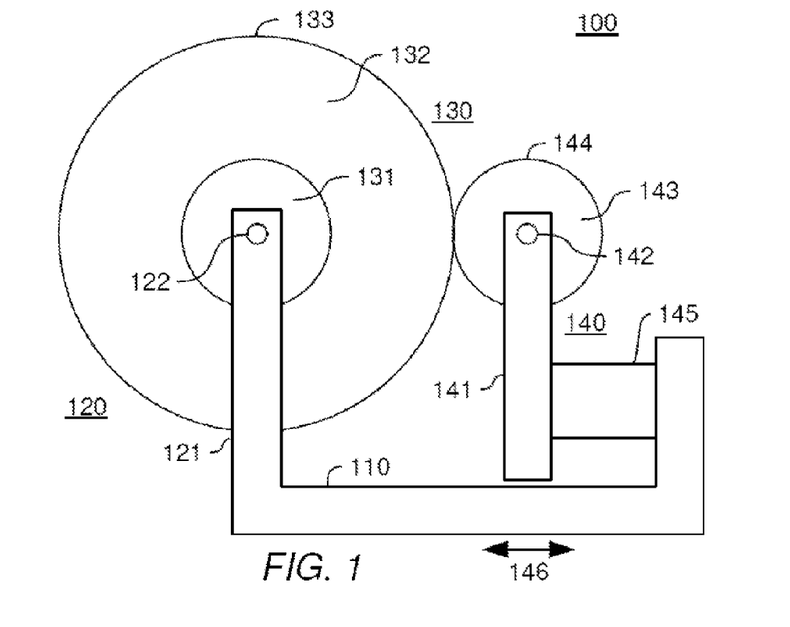
FIG. 1 shows an apparatus for analyzing a vehicle wheel according to an embodiment of the invention.

FIG. 1 shows an apparatus 100 for analyzing a vehicle wheel 130 according to an embodiment of the invention. The vehicle wheel 130 will be described in more details with reference to FIG. 2. With regard to quality of measurement the apparatus 100 is of high precision and free of play. With regard to precision, but also price, market penetration, distribution and usability the apparatus 100 is preferably of a compact type.

The apparatus 100 may comprise a base 110, a rotatable assembly 120 coupled to the base 110, a drum assembly 140 coupled to the base 110 and a measuring device 145.

The rotatable assembly 120 comprises a first support element 121 and a first rotatable axis 122. The first support element 121 may be connected to the base 110 as shown in FIG. 1 or movably, for example pivotally, rotatably or slidably, coupled to the base 110 (not shown). The first axis 122 may receive and hold the vehicle wheel 130 to be analyzed. The vehicle wheel 130 may be arranged vertically, horizontally or inclined by a certain angle. The vehicle wheel 130 comprises a rim 131 and a tire 132 with a tread surface 133. The tire 132 may be a pneumatic tire and comprise a pressurized gas or mixture of gases, for example atmospheric air (not shown). The vehicle wheel 130 may be intended for a motorized vehicle, for example a car, bus, light truck, heavy truck or motorcycle, or an aircraft.

The drum assembly 140 comprises a second support element 141, a second rotatable axis 142 and a drum or roller 143 with an outer shell surface 144. The outer shell surface 144 and the tread surface 133 may be brought in contact and pressed against one another with force. Thus, the second support element 141 may be slidably coupled to the base 110 in directions indicated by an arrow 146 shown in FIG. 1 or movably, for example pivotally or rotatably, coupled, or connected to the base 110 (not shown). A diameter of the drum 143 may be approximately between 0.05 m and 5 m, for example approximately between 0.2 m and 0.4 m, preferably approximately 0.3 m. A ratio of the diameter of the drum 143 to a diameter of the vehicle wheel 130 may be approximately between 0.1 and 1. The drum 143 may be substantially solid or hollow. If the first drum is hollow and the ratio of the diameter of the first drum to the diameter of the vehicle wheel 130 is greater than 1, the vehicle wheel 130 may be arranged inside the hallow drum, and an inner shell surface of the hallow drum and the tread surface 133 may be brought in contact (not shown). The drum may also be an endless belt passing around wheels, for example a caterpillar (not shown).

The apparatus 100 may further comprise an actuator (not shown). The actuator may be coupled to the rotatable assembly 120 or the drum assembly 140. The actuator may produce the force for pressing the outer shell surface 144 and the tread surface 133 against one another in a contact area. The actuator may comprise a rotatable spindle. The actuator may be electrically, hydraulically or pneumatically actuated or actuated by any suitable means. The actuator may be coupled to a control unit (not shown). Alternatively, the force may be produced by any suitable means, for example a spring or weight, providing a similar effect (not shown).

The measuring device 145 measures vertical or horizontal or tangential acceleration, or a combination thereof directly or indirectly in the contact area. The acceleration sensor may preferably measure vertical acceleration. The measuring device 145 may comprise an acceleration sensor of any suitable means. The measuring device 145 may be serially arranged or arranged in parallel with other sensors or gauging members. The acceleration sensor may be selectively operable or switchable between measuring ranges. The measuring device 145 may be coupled to the control unit.

The measuring device 145 may be coupled the drum assembly 140. The measuring device 145 may be connected to the second support element 141 and the base 110 as shown in FIG. 1. The measuring device 145 may also be connected to the second axis 142, or arranged on the outer surface 144 (not shown). Thus, the measuring device 145 is assigned to the drum 143. The measuring device 145 may also be connected to the first support element 121 or the first axis 122 (not shown). Thus, the measuring device 145 may be assigned to the vehicle wheel 130.

The apparatus 100 may further comprise a motor (not shown). The motor rotates the vehicle wheel 130 clockwise or count-clockwise, directly or indirectly. The motor may be coupled to the vehicle wheel 130 or the first drum 143. Thus, the vehicle wheel 130 or the drum 143 or both may be powered. The motor may be directly connected or coupled via a belt, a chain, a gear, or any suitable means providing similar functionality (not shown). The motor may be electrically, hydraulically or pneumatically powered or powered by any suitable means.

The apparatus 100 may further comprise a force sensor (not shown). The force sensor may measure force directly or indirectly. The force sensor may measure force, bending or pressure, for example. The force sensor may comprise a force measuring device, for example a strain gauge, magneto-elastic sensor, piezo-electric sensor, oscillating-crystal sensor, or any suitable means. The force sensor may be combined with or integrated in the measuring device 145. The force sensor may also be coupled to the control unit.

The control unit may be a computer, for example a personal computer, for controlling the apparatus 100 and processing received measurement data, for example peak-to-peak acceleration data. The computer collects the measurement data, performs calculations, for example mean or root-mean-square (RMS) analysis, thereon, stores or transmits results, and displays same on a display.

In the apparatus 100 aiming to provide ideal-road conditions for reproducible measurements, variations in the acceleration data correspond with non-uniformities of the vehicle wheel.

In the apparatus 100, and a corresponding system, for analyzing a vehicle wheel 130 comprising a tire 132 of a predetermined configuration and a thixotropic balancing substance, the vehicle wheel 130 is rotated with a predetermined number of revolutions for a period of time, wherein a tread surface 133 of the tire 132 is pressed in a first contact area against a rotatable drum 143 with a predetermined force, and a first acceleration in the first contact area is measured with a measuring device 145; another vehicle wheel comprising another tire of the predetermined configuration is rotated with the predetermined number of revolutions for another period of time, the other vehicle wheel being conventionally balanced and having another residual unbalance, wherein another tread surface of the other tire is pressed in a second contact area against the rotatable drum 143 with the predetermined force, and a second acceleration in the second contact area is measured with the measuring device 145; and, if the first acceleration is less than or equal to the second acceleration that the vehicle wheel 130 is determined balanced.

The method of analyzing a vehicle wheel 130 comprising a tire 132 of a predetermined configuration and a thixotropic balancing substance comprises rotating the vehicle wheel 130 with a predetermined number of revolutions for a period of time, wherein a tread surface 133 of the tire 132 is pressed in a first contact area against a rotatable drum 143 with a predetermined force, and a first acceleration in the first contact area is measured with a measuring device 145; rotating another vehicle wheel comprising another tire of the predetermined configuration with the predetermined number of revolutions for another period of time, the other vehicle wheel being conventionally balanced and having another residual unbalance, wherein another tread surface of the other tire is pressed in a second contact area against the rotatable drum 143 with the predetermined force, and a second acceleration in the second contact area is measured with the measuring device 145; and, if the first acceleration is less than or equal to the second acceleration, determining that the vehicle wheel 130 is balanced.

While conventional methods for analyzing a conventional vehicle wheel operate upon the wheel in an unloaded condition, a vehicle wheel comprising a tire and a thixotropic balancing substance shows its balancing effect only in a loaded condition. Thus, the method for analyzing this vehicle wheel should preferably operate upon the vehicle wheel in a loaded condition. However, in the loaded condition, a determined non-uniformity results partially from an uneven mass distribution, and partially from a variation in axial, radial or tangential stiffness.

As the conventional vehicle wheel has been conventionally balanced in an unloaded condition, it may show, in addition to the variations in stiffness, a more uneven mass distribution owing to a flatting in the loaded (real) condition as compared to the unloaded (simplified) condition. On the other hand, the vehicle wheel comprising the tire and the thixotropic balancing substance shows mainly the variations in stiffness, if balanced; it may show, in addition to the variations in stiffness, an uneven mass distribution, only if the thixotropic balancing substance cannot balance the wheel. A reason for this may be an abnormal uneven mass distribution of the tire.

Absolute values of the accelerations to be measured depend on operating conditions affecting the wheels, for example, temperature of environment, temperature of tires, pressure of tires, load, i.e. force, on tires, speed of tires. With regard to quality of measurement, the tire and the other tire, and also operating conditions should be identical. However, it may be possible to provide the apparatus 100 with the second acceleration that has been measured using another apparatus.

The method may further comprise, if the first acceleration is greater than the second acceleration, determining that the vehicle wheel 130 is unbalanced.

In the method, the predetermined number of revolutions may amount to approximately between 15 1/s and 55 1/s, for example approximately between 25 1/s and 45 1/s, preferably approximately 35 1/s. A peripheral speed, at the tread surface 133, is a function of the diameter of the vehicle wheel 130 times pi times the predetermined number of revolutions. In the method, the corresponding peripheral speed may be approximately between 100 km/h (about 28 m/s) and 300 km/h (about 83 m/s), for example approximately between 150 km/h (about 42 m/s) and 250 km/h (about 69 m/s), preferably approximately 200 km/h (about 56 m/s). Preferably, the predetermined number of revolutions, or peripheral speed, should be adapted to resemble intended driving conditions, that may, for example, depend on the predetermined configuration of the tire.

In the method, the predetermined force may amount to approximately between 100 N and 10 kN, for example approximately between 200 N and 5 kN, preferably approximately between 300 N and 2 kN, more preferably approximately between 500 N and 1.5 kN, such as approximately 1 kN. In the method, a corresponding weight may amount to approximately between 10 kg and 1 t, for example approximately between 20 kg and 500 kg, preferably approximately between 30 kg and 200 kg, more preferably approximately between 50 kg and 150 kg, such as approximately 100 kg. Preferably, the predetermined force, or corresponding weight, should be adapted to resemble intended driving conditions, that may, for example, depend on the predetermined configuration of the tire.

In the method, the predetermined configuration of the tire 132 may be determined by make or type or size, or, preferably, a combination thereof. The method aims to utilize identical tires in terms of manufacture, make, type, size and, possibly, production period or production charge, or EAN-Number, Universal Product Code (UPC), or the like.

In the method, the first acceleration and the second acceleration may each comprise a vertical acceleration or horizontal acceleration or tangential acceleration, or combination thereof. The vertical acceleration may also be referred to as acceleration in pressing direction.

The method may further comprise determining the first acceleration as mean, for example root mean square (RMS), from a first plurality of acceleration values, for example peak-to-peak values, measured during the period of time; and determining the second acceleration as mean, for example root mean square (RMS), from a second plurality of acceleration values, for example peak-to-peak values, measured during the other period of time. Measurements may be taken rate of approximately between 1 1/s and 10000 1/s, for example approximately between 10 1/s and 1000 1/s, preferably approximately between 50 1/s and 500 1/s, such as approximately 100 1/s.

In the method, the measuring device 145 may comprises an acceleration sensor. In the method, the measuring device 145 may be assigned to the vehicle wheel 130 and the other vehicle wheel. Alternatively, the measuring device 145 may be assigned to the drum 143.

In the method, during rotating the vehicle wheel 130 with the predetermined number of revolutions the balancing substance may be distributed in the tire 132, such that the vehicle wheel 130 is balanced except for a residual unbalance. The distribution of the balancing substance may precede the measuring of the first acceleration.

In the method, the vehicle wheel 130 may comprise a rim of a predetermined configuration; and the other vehicle wheel comprises another rim of the predetermined configuration. Furthermore, the other vehicle wheel may comprise weights for conventionally balancing the other vehicle wheel; and the weights may be attached, for example clipped or glued, to the other rim.

In the method, the vehicle wheel 130 and the other vehicle wheel may be powered. Alternatively, the drum 143 may be powered. Alternatively, the wheels and the drum 143 may be powered.

In the method, the vehicle wheel 130 may be one of a first set of vehicle wheels comprising a tire 132 of the predetermined configuration and the thixotropic balancing substance, and the other vehicle wheel may be one in a second set of vehicle wheels being conventionally balanced and accepted. The second acceleration, that is the acceleration of the other vehicle wheel, may be less or greater than a mean of accelerations of vehicle wheels in the second set. Alternatively, it may be determined that the vehicle wheel 130 is balanced and, if the first acceleration is less than or equal to the mean of accelerations of vehicle wheels in the second set.

Figure 2:
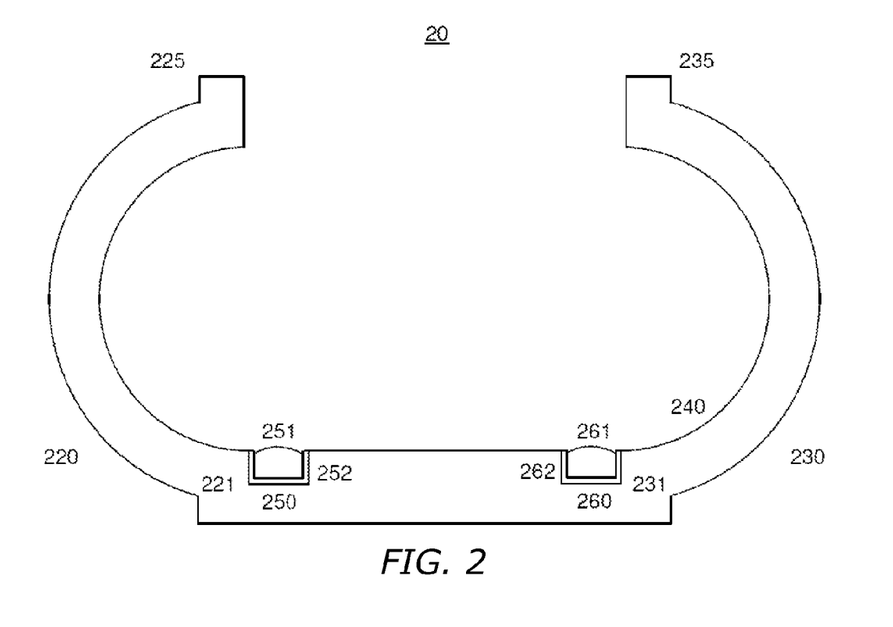
FIG. 2 shows a cross-sectional view of a vehicle tire.

FIG. 2 shows a schematic cross-sectional view of a vehicle tire 20. The vehicle tire 20 comprises a circumferential tread surface 210 defining a tread face on an outer surface, a first sidewall portion 220 with a first shoulder portion 221 and a first bead portion 225, a second sidewall portion 230 with a second shoulder portion 231 and a second bead portion 235 axially spaced from the first bead portion 225 to form a toroidal shape and an annular hollow. The tire 20 may be a pneumatic tire and comprise a pressurized gas or mixture of gases, for example atmospheric air (not shown). The vehicle tire 20 may be intended for a motorized vehicle, for example a car, bus, light truck, heavy truck or motorcycle, or an aircraft.

The vehicle tire 20 may further comprise a first circumferential balancing area 250 on an inner side 240, for example an inner liner of the tire 20. The first balancing area 250 may be arranged between the first shoulder portion 221 and the second shoulder portion 231, closer, preferably next, to the first shoulder portion 221. The first balancing area 250 may be formed as a groove. The groove may be formed during production of the tire 20 or later, for example during processing of the tire 20. The balancing area 250 comprises a first amount of the balancing substance 251. The balancing substance may be a thixotropic balancing substance, such as a thixotropic gel. The first amount of the balancing substance 251 may be distributed on the first balancing area 250 during processing of the tire 20. The first amount of the balancing substance 251 may preferably distributed substantially uniformly. A surface of the first balancing area 250 may comprise a first nanostructure 252. The first nanostructure 252 increases movability of the first amount of the balancing substance 251 on the first balancing area 250 for balancing the tire 20 and a rim (not shown) forming a vehicle wheel. The first nanostructure 252 may be formed during production of the tire 20 or later, for example during processing of the tire 20.

The tire 20 may further comprise a second balancing area 260 comprising a second amount of the balancing substance 261. The second balancing area 260 may arranged between the first shoulder portion 221 and the second shoulder portion 231, closer, preferably next, to the second shoulder portion 231. A surface of the second balancing area 260 may comprise a second nanostructure 262. The second balancing area 260 may be processed similarly or identically to, and preferably simultaneously with, the first balancing area 250.

Figure 3:
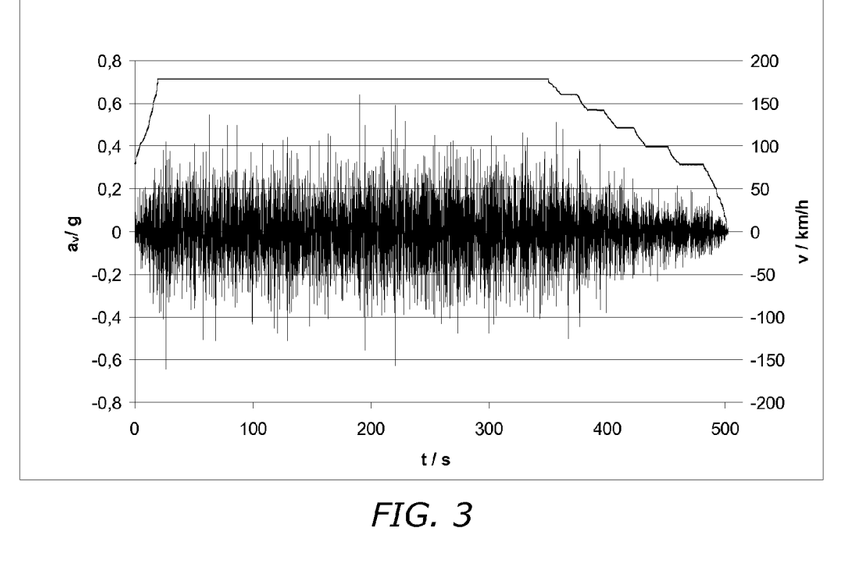
FIG. 3 shows an exemplary representation of a vertical acceleration of a vehicle wheel over time.

FIG. 3 shows an exemplary representation of a vertical acceleration ($a_v$), that is an acceleration in pressing direction, in acceleration of gravity (g), that is approximately 9.81 m/s$^2$, of a vehicle wheel over time (t) in seconds (s), together with a representation of a corresponding peripheral speed (v) of the vehicle wheel in kilometres per hour (km/h) for a load of about 1 kN. The representation derives from experimental data taken at a rate of about 10 1/s from a method according to an embodiment of the invention and covers a period of about 500 s. The vehicle wheel denoted number 6 is in a first set of vehicle wheels comprising a tire 132 of a predetermined configuration and the thixotropic balancing substance. The predetermined configuration is determined by make GOODYEAR and dimension 245/45R18. Over time, the peripheral speed increases from 0 km/h at 0 s to about 180 km/h at about 20 s, remains at this level to about 350 s, and decreases stepwise to 0 km/h at about 500 s, and peak-to-peak values of the acceleration vary between about +0.6 g to −0.6 g indicating a loading and load relieving, respectively.

Figure 4:
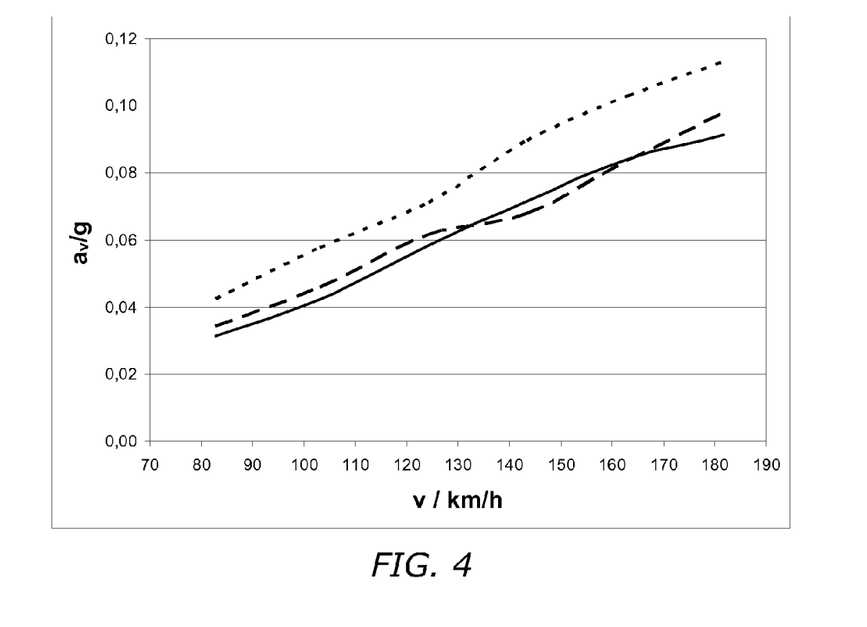
FIG. 4 shows an exemplary representation of vertical accelerations of a vehicle wheel as a function of a peripheral speed of the vehicle wheel for three different loads.

FIG. 4 shows an exemplary representation of vertical accelerations ($a_v$), that is accelerations in pressing direction, as root mean square (RMS) in acceleration of gravity (g) of a vehicle wheel as a function of a peripheral speed (v) of the vehicle wheel in kilometres per hour (km/h) for three different loads. The representation derives from experimental data taken at a rate of about 1000 1/s from a method according to an embodiment of the invention. The vehicle wheel denoted number 1 is in a second set of vehicle wheels comprising a tire of the predetermined configuration and being conventionally balanced. A residual unbalance is about 0 g, i.e. about 0 grams. The predetermined configuration is also determined by make GOODYEAR and dimension 245/45R18. For a load represented by a weight of about 30 kg, i.e. about 300 N, the RMS of the vertical acceleration indicated in FIG. 4 by a solid line increases from about 0.031 g at about 80 km/h to about 0.091 g at about 180 km/h. For a load represented by a weight of about 60 kg, i.e. about 600 N, the RMS of the vertical acceleration indicated in FIG. 4 by a dashed line increases from about 0.036 g at about 80 km/h to about 0.098 g at about 180 km/h. The RMS of the vertical acceleration for 60 kg falls at about 130 km/h under the RMS of the vertical acceleration for 30 kg to overtake it at about 165 km/h. For a load represented by a weight of about 120 kg, i.e. about 1.2 kN, the RMS of the vertical acceleration indicated in FIG. 4 by a dotted line increases from about 0.042 g at about 80 km/h to about 0.113 g at about 180 km/h. FIG. 4 shows that vertical accelerations increase, approximately linearly, with increasing peripheral speed, and increase with increasing load.

Figure 5A:
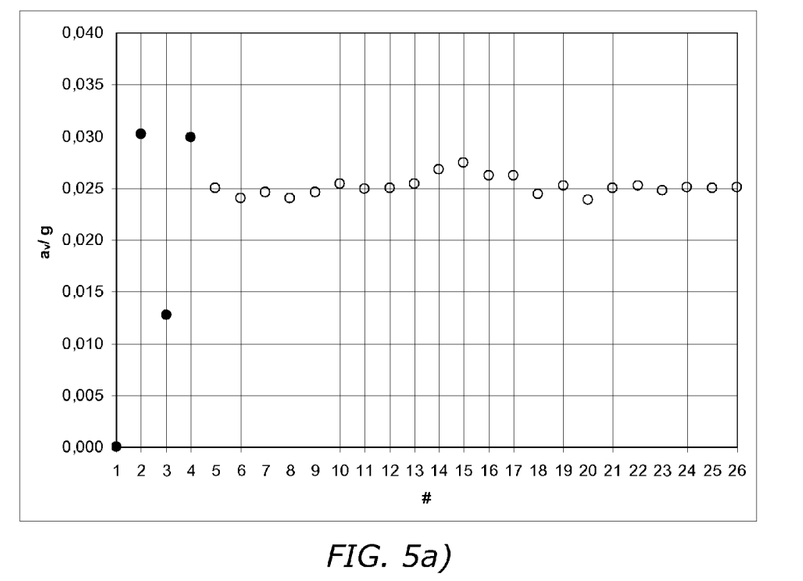
FIGS. 5a)-5c) show comparisons of vertical accelerations between a first set of vehicle wheels each comprising a tire of a predetermined configuration and the thixotropic balancing substance, and a second set of vehicle wheels each comprising a tire of the predetermined configuration and being conventionally balanced for three load/peripheral speed pairs.
Figure 5B:
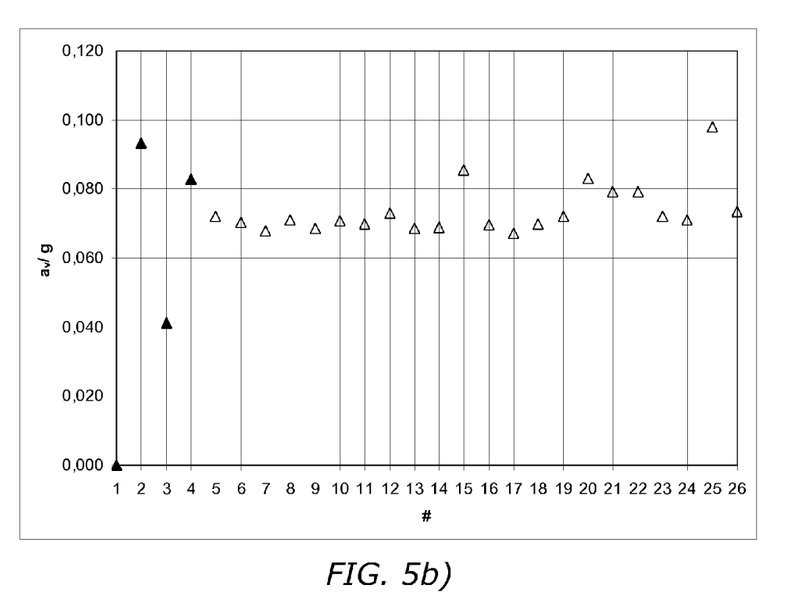
Figure 5C:
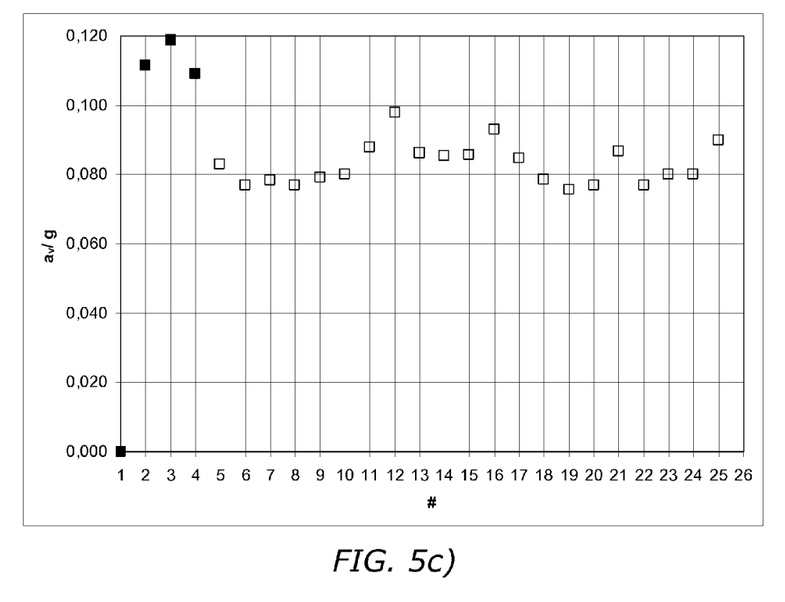

FIGS. 5a)-5c) show comparisons of vertical accelerations ($a_v$), that is accelerations in pressing direction, between a first set of vehicle wheels #5 to 25 each comprising a tire of a predetermined configuration and the thixotropic balancing substance, and a second set of vehicle wheels #2 to 4 each comprising a tire of the predetermined configuration and being conventionally balanced as root mean square (RMS) in acceleration of gravity (g) for three load/peripheral speed pairs.

The representation derives from experimental data a method according to an embodiment of the invention. The predetermined configuration is also determined by make GOODYEAR and dimension 245/45R18. The vehicle wheels denoted numbers 5 to 25 and indicated in FIGS. 5a)-5c) by outlined markers are in the first set of vehicle wheels each comprising a tire of the predetermined configuration and the thixotropic balancing substance. The vehicle wheels denoted numbers 2 to 4 and indicated in FIGS. 5a)-5c) by filled markers are in the second set of vehicle wheels each comprising a tire of the predetermined configuration and being conventionally balanced using metal weights and accepted. Residual unbalances are about 0 g, i.e. about 0 grams.

FIG. 5a) shows a comparison of vertical accelerations, that is accelerations in pressing direction, between the first set of vehicle wheels and the second set of vehicle wheels as root mean square (RMS) in acceleration of gravity (g) for a load of about 300 N and a peripheral speed of about 80 km/h. In the second set of vehicle wheels indicated in FIG. 5a) by filled round markers, the RMS of the vertical accelerations of vehicle wheels 2 and 4 are about 0.030 g, and the RMS of the vertical acceleration of vehicle wheel 3 is about 0.013 g. Thus, vertical acceleration of vehicle wheel 3 is less than vertical accelerations of vehicle wheels 2 and 4, and vehicle wheel 3 provides for a better result than vehicle wheels 2 and 4. In the first set of vehicle wheels indicated in FIG. 5a) by outlined round markers, the RMS of the vertical accelerations of vehicle wheels 5 to 25 range from about 0.024 g to about 0.027 g. Thus, vertical accelerations of vehicle wheels 5 to 25 are less than vertical accelerations of vehicle wheels 2 and 4, vehicle wheels 5 to 25 provide for better results than vehicle wheels 2 and 4. As wheels 2 and 4 were accepted, wheels 5 to 25 are balanced and can also be accepted.

FIG. 5b) shows a comparison of vertical accelerations, that is accelerations in pressing direction, between the first set of vehicle wheels and the second set of vehicle wheels as root mean square (RMS) in acceleration of gravity (g) for a load of about 1 kN and a peripheral speed of about 135 km/h. The speed of about 135 km falls within a resonance range of a relevant test vehicle. Vertical accelerations for the load of about 1 kN and the peripheral speed of about 135 km/h are generally greater than vertical accelerations for the load of about 300 N and the peripheral speed of about 80 km/h. In the second set of vehicle wheels indicated in FIG. 5b) by filled triangular markers, the RMS of the vertical accelerations of vehicle wheels 2 and 4 are about 0.093 g and 0.083 g, respectively, and the RMS of the vertical acceleration of vehicle wheel 3 is about 0.041 g. Thus, vertical acceleration of vehicle wheel 3 is less than vertical accelerations of vehicle wheels 2 and 4, and vehicle wheel 3 provides for a better result than vehicle wheels 2 and 4. In the first set of vehicle wheels indicated in FIG. 5b) by outlined triangular markers, the RMS of the vertical accelerations of vehicle wheels 5 to 25 range from about 0.068 g to about 0.098 g. Thus, vertical accelerations of vehicle wheels 5 to 25 are generally less than vertical accelerations of vehicle wheels 2 and 4, and vehicle wheels 5 to 25 provide generally for better results than vehicle wheels 2 and 4. As wheels 2 and 4 were accepted, wheels 5 to 25 are balanced and can also be accepted.

FIG. 5c) shows a comparison of vertical accelerations, that is accelerations in pressing direction, between the first set of vehicle wheels and the second set of vehicle wheels as root mean square (RMS) in acceleration of gravity (g) for a load of about 1 kN and a peripheral speed of about 180 km/h. Vertical accelerations for the load of about 1 kN and the peripheral speed of about 180 km/h are generally greater than vertical accelerations for the load of about 1 kN and the peripheral speed of about 135 km/h. However, in the first set, the vertical accelerations are more stable than in the second set. In the second set of vehicle wheels indicated in FIG. 5c) by filled squared markers, the RMS of the vertical accelerations of vehicle wheels 2, 3 and 4 are about 0.111 g, 0.119 g and 0.109 g, respectively. Thus, vertical acceleration of vehicle wheel 3 is greater than vertical accelerations of vehicle wheels 2 and 4, and now vehicle wheels 2 and 4 provide for a better result than vehicle wheel 3. In the first set of vehicle wheels indicated in FIG. 5c) by filled markers, the RMS of the vertical accelerations of vehicle wheels 5 to 25 range from about 0.076 g to about 0.093 g. Thus, vertical accelerations of vehicle wheels 5 to 25 are less than vertical accelerations of vehicle wheels 2, 3 and 4, and vehicle wheels 5 to 25 provide for better results than vehicle wheels 2, 3 and 4. As wheels 2, 3 and 4 were accepted, wheels 5 to 25 are balanced and can also be accepted.

As described with reference to FIGS. 5a)-5c) the first set of vehicle wheels provides for better results than the second set of vehicle wheels. Moreover, the method according to an embodiment of the invention efficiently analyzes whether a vehicle wheel comprising a tire and a thixotropic balancing substance is balanced, and determines a residual unbalance of the vehicle wheel.

Embodiments of the inventions comprise a corresponding system, that may carry out the method, possibly across a number of devices.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the full scope of equivalents to which such claims are entitled.

The invention claimed is:

1. A method of analyzing a vehicle wheel (130) comprising a tire (132) of a predetermined configuration and a thixotropic balancing substance, comprising:
rotating the vehicle wheel (130) with a predetermined number of revolutions for a period of time, wherein a tread surface (133) of the tire (132) is pressed in a first contact area against a rotatable drum (143) with a predetermined force, and a first acceleration in the first contact area is measured with a measuring device (145);
rotating a second vehicle wheel comprising a second tire of the predetermined configuration with the predetermined number of revolutions for a second period of time, the second vehicle wheel being conventionally balanced and having a residual unbalance, wherein a second tread surface of the second tire is pressed in a second contact area against the rotatable drum (143) with the predetermined force, and a second acceleration in the second contact area is measured with the measuring device (145); and
if the first acceleration is less than or equal to the second acceleration, determining that the vehicle wheel (130) is balanced.

2. The method of claim 1, further comprising:
if the first acceleration is greater than the second acceleration, determining that the vehicle wheel (130) is unbalanced.

3. The method of claim 1, wherein:
the predetermined number of revolutions amounts to approximately between 15 1/s and 55 1/s, or approximately between 25 1/s and 45 1/s, or approximately 35 1/s.

4. The method of claim 1, wherein:
the predetermined number of revolutions corresponds, at the tread surface (133) and the second tread surface, to a peripheral speed being approximately between 100 km/h (about 28 m/s) and 300 km/h (about 83 m/s), or approximately between 150 km/h (about 42 m/s) and 250 km/h (about 69 m/s), or approximately 200 km/h (about 56 m/s).

5. The method of claim 1, wherein:
the predetermined force amounts to approximately between 100 N and 10 kN, or approximately between 200 N and 5 kN, or approximately between 300 N and 2 kN, or approximately between 500 N and 1.5 kN, or approximately 1 kN.

6. The method of claim 1, wherein:
the predetermined configuration of the tire (132) is determined by make or type or size or a combination thereof.

7. The method of claim 1, wherein:
the first acceleration and the second acceleration each comprise a vertical acceleration or a horizontal acceleration or a tangential acceleration, or a combination thereof.

8. The method of claim 1, further comprising:
determining the first acceleration as a mean, or a root mean square (RMS), from a first plurality of acceleration values, or peak-to-peak values, measured during the period of time; and
determining the second acceleration as a mean, or a root mean square (RMS), from a second plurality of acceleration values, or peak-to-peak values, measured during the second period of time.

9. The method of claim 1, wherein:
the measuring device (145) comprises an acceleration sensor.

10. The method of claim 1, wherein:
the measuring device (145) is assigned to the vehicle wheel (130) and the second vehicle wheel.

11. The method of claim 1, wherein:
the measuring device (145) is assigned to the drum (143).

12. The method of claim 1, wherein:
during rotating the vehicle wheel (130) with the predetermined number of revolutions, the balancing substance is distributed in the tire (132), such that the vehicle wheel (130) is balanced except for a residual unbalance.

13. The method of one of claim 1, wherein:
the vehicle wheel (130) comprises a rim of a predetermined configuration, and
the second vehicle wheel comprises a second rim of the predetermined configuration.

14. An apparatus (100) for analyzing a vehicle wheel (130) comprising a tire (132) of a predetermined configuration and a thixotropic balancing substance, the apparatus comprising:
a. means (143) for rotating the vehicle wheel (130) with a predetermined number of revolutions for a period of time, wherein a tread surface (133) of the tire (132) is pressed in a first contact area against a rotatable drum (143) with a predetermined force, and a first acceleration in the first contact area is measured with a measuring device (145),
b. means (143) for rotating a second vehicle wheel comprising a second tire of the predetermined configuration with the predetermined number of revolutions for a second period of time, the second vehicle wheel being conventionally balanced and having a residual unbalance, wherein a second tread surface of the second tire is pressed in a second contact area against the rotatable drum (143) with the predetermined force, and a second acceleration in the second contact area is measured with the measuring device (145); and
c. means for determining, if the first acceleration is less than or equal to the second acceleration, that the vehicle wheel (130) is balanced.

* * * * *